May 7, 1935.  W. F. OLIVER  2,000,187
MASTER CYLINDER
Filed Oct. 17, 1932
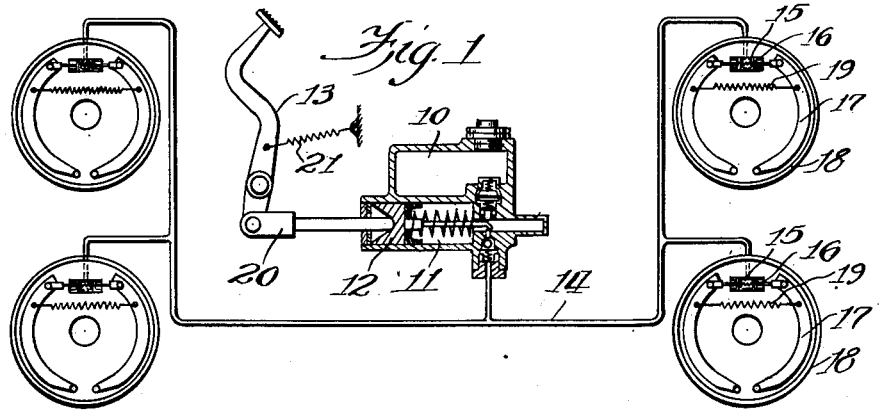
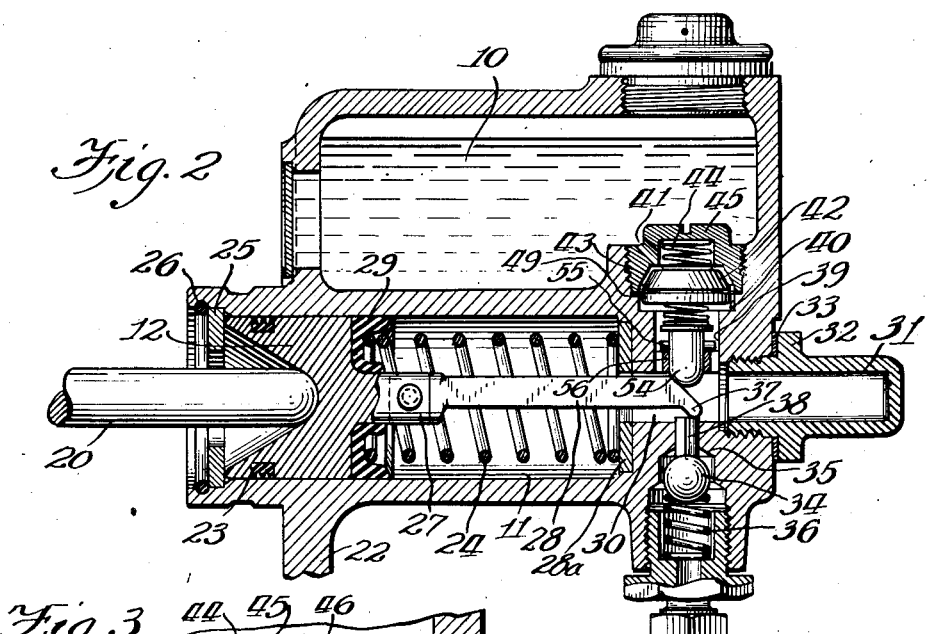
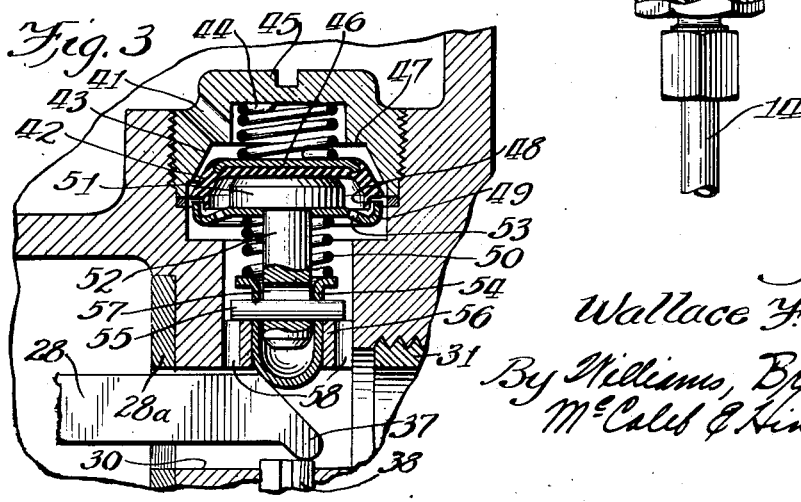
Inventor:
Wallace F. Oliver
By Williams, Bradbury,
McCaleb & Hinkle
Attys.

Patented May 7, 1935

2,000,187

UNITED STATES PATENT OFFICE 2,000,187

MASTER CYLINDER

Wallace F. Oliver, Detroit, Mich., assignor to Hydraulic Brake Company, Detroit, Mich., a corporation of California Application October 17, 1932, Serial No. 638,060

9 Claims. (Cl. 60—54.6)

My invention pertains to master cylinders and is particularly concerned with the master cylinders of hydraulic brakes and other fluid systems of power transmission.

In the hydraulic brake systems now in commercial use on automotive vehicles, the master or compression cylinder is provided with a small compensating port which is located directly in front of the master cylinder piston when the latter is in retracted position, and the purpose of this port is to provide free communication between the interior of the master cylinder and the fluid reservoir which forms a part of the brake system. Such a compensating port is indicated by the reference numeral 42 in Loughead and Loweke Patent No. 1,758,671, issued May 13, 1930. The forward face of the piston is provided with a rubber cup washer such as indicated at 25 in said patent, and the frequent movement of this rubber cup past the compensating port produces undesirable wear on the edge of the cup.

An object of my invention is to avoid the use of a compensating port which is covered and uncovered by the piston each time the brake system is used.

In the hydraulic brake systems now in common use it is also usual to provide openings through the metal piston immediately in rear of the rubber cup washer, in order to facilitate flow of fluid past the piston and cup washer during the return stroke thereof. Such openings are indicated by the reference numeral 41 in said Loughead and Loweke patent. The parts of the rubber cup washer which cover these openings are unsupported, and when an emergency application of the brakes is made it sometimes happens that the pressure created in the master cylinder is sufficiently great to force these parts of the rubber cup washer back into these openings, with resultant injury to the rubber cup. In order to avoid the creation of pressures which would thus damage the rubber cup washer, the brake designer is limited to the use of a master cylinder of greater diameter than would otherwise be necessary or desirable.

Another object of my invention is to provide a master cylinder wherein additional fluid is drawn into the cylinder from the reservoir during the return stroke of the piston, but wherein no openings are provided through the piston.

The construction now in common use also has the disadvantage of requiring a body of fluid in communication with the rear of the piston, and where it is desired to locate the master cylinder outside of the reservoir, as shown, for example, in Loughead Patent No. 1,847,402, it is necessary to lengthen the master cylinder and piston in order to provide a fluid-containing chamber in rear of the piston. In said Loughead Patent No. 1,847,402, the annular recess 16 formed in the piston is always in free communication with the fluid reservoir and is one example of such a fluid chamber in rear of the forward face of the piston.

Another object of my invention is to provide a more compact arrangement wherein the cylinder may be located outside of the reservoir without lengthening the piston and cylinder.

Another object is to provide a new and improved valve mechanism between the cylinder and the conduits leading to the brakes at the vehicle wheels.

Another object is to provide novel control means for said valve.

Another object is to provide a new and improved valve means between the cylinder and the fluid reservoir.

Another object is to provide novel control means for said last-mentioned valve.

Another object is to provide a master cylinder which is simpler, more durable, and less expensive to manufacture than those now on the market.

Other objects and advantages will become apparent as the description proceeds.

In the drawing,

Fig. 1 is a diagrammatic view of a hydraulic brake system incorporating my new and improved master cylinder;

Fig. 2 is a sectional elevation through my new and improved master cylinder, showing the parts in approximately full size; and Fig. 3 is an enlarged view of the valve mechanism interposed between the master cylinder and the fluid reservoir.

Referring to Fig. 1, I have shown a hydraulic brake system comprising a fluid reservoir 10, master cylinder 11, master cylinder piston 12, operating lever 13, conduit system 14, wheel cylinders 15, wheel cylinder pistons 16, brake shoes 17, brake drums 18, and brake shoe retractile springs 19. The lower end of the brake pedal is pivoted to a piston rod 20 which forms a separable abutting connection with the piston 12 which permits the spring 21 to return the pedal 13 and piston rod 20 independently of the piston 12.

Referring particularly to Fig. 2, it will be seen that I have illustrated an embodiment of my invention wherein the reservoir 10 and cylinder 11 are provided by a single integral casting having a bracket or flange 22 which forms a convenient means of attaching the casting to the frame or other suitable part of an automotive vehicle.

The piston 12 is preferably formed of metal and is provided with an annular groove in which is located a sealing ring 23. The particular sealing means indicated is of the type disclosed and claimed in a United States patent application filed in the name of Erwin F. Loweke, Serial No. 636,449, filed October 6, 1932, although it will be understood that any other suitable sealing means may be used in lieu thereof.

The spring 24 normally maintains the piston 12 in contact with a stop 25 which is retained against a shoulder formed at the rear end of the cylinder 11 by a C spring 26. The forward face of the piston 12 has a centrally located cylindrical extension 27 to which is secured, by any suitable means, a valve control rod 28. The forward face of the piston is also provided with a rubber sealing washer 29.

When the piston 12 is in the rest position, as shown in the drawing, the end of valve control rod 28 lies in a bore 30 which is in open communication with the bore of the cylinder 11. The right-hand end of the bore 30 is closed by a cap 31 which is screw-threaded to the casting in which is formed the cylinder 11. The cap 31 is provided with a flange 32, and a sealing gasket 33 is interposed between this flange and the adjacent wall of the casting. The cap 31 is made of sufficient length to receive the end of the valve control rod 28 when the piston 12 is advanced to the full limit of its forward stroke.

I have illustrated the valve control rod 28 as being a flat stamping which is guided by the rectangular slot provided in a stamped plate 28a pressed into the cylinder casting at the outlet or discharge end thereof.

Interposed between the bore 30 and the conduit system 14 is a ball check valve 34 which is urged against the seat 35 by a spring 36. When the piston is in the rest position the toe 37, on the end of the valve control rod 28, rests on the upper end of a fluted stem 38 and holds the valve 34 away from its seat 35, so that the conduit system 14 is in free communication with the cylinder 11.

Bore 30 communicates with reservoir 10 by means of passageway 39, valve chamber 40, and port 41. A cup-shaped valve 42 of rubber or other suitable material is located in the valve chamber 40 and is pressed away from its seat 43 by a spring 44 resting against a recess formed in a removable plug 45 which also provides the valve seat 43 and port 41. The base of the cup valve 42 has a metal insert 46 which rests against the shoulder 47 when the valve is in closed position, and prevents cutting of the rubber valve by the edge of this shoulder. The valve seat 43 is made of greater width than the depth of the cup so that the rubber sides of the cup valve contact with a smooth surface and are not pressed against the lower edge of the valve seat 43.

The lower edge of the valve 42 is provided with a flange 48 which lies within the upper edge of a cap 49, the purpose of which is to prevent the lower edge of the valve 42 from flaring outwardly into contact with the wall of the valve chamber and thereby preventing free passage of fluid past the valve while in its open position.

The cap 49 is held in place by a spring 50 which presses this cap against the head 51 of member 52. Openings 53 in cap 49 provide free access for fluid to the under side of the valve 42 so that fluid pressure may increase the seal between the valve and its seat during the compression stroke of the master cylinder piston 12.

Spring 50 rests on the upper flanged end of a valve operating element 54 having a pin 55 which rests on the top of a guiding spider 56 provided by the reservoir and cylinder casting. The pin 55 extends through a slot 57 in the lower end of the member 52. Spring 50 is stronger than spring 44 and maintains the member 52 at the upper limit of its movement relative to pin 55. The dimensions of the parts are such that when the piston 12 is in retracted position and the end of the valve control rod 28 is withdrawn from beneath the valve operating element 54, the valve 42 is separated from its seat and free communication is provided between the reservoir 10 and bore 30.

The operation of a system incorporating my new and improved master cylinder is as follows. With the parts in the positions of rest shown in the drawing, there is free communication between the conduit system 14, wheel cylinders 15, master cylinder 11, and reservoir 10. This arrangement permits fluid to flow from the reservoir into the conduit system to take the place of any fluid which may have escaped from the system, and also to compensate for contraction of fluid in the conduit system due to temperature variations. Likewise, excess fluid in the conduit system and wheel cylinders, caused by expansion of fluid due to temperature changes, may freely return to the reservoir.

When the operator depresses the pedal 13, piston 12 is advanced to the right and fluid is forced from the master cylinder 11 into the bore 30, and thence past valve 34 into conduit system 14. The initial movement of piston 12 causes the end of valve control rod 28 to move valve actuating member 54 upwardly. This tends to compress spring 50, but since this spring is stronger than spring 44 the result is that the latter is compressed and valve 42 is moved upwardly and into contact with its seat 43. The lost motion connection member 52 and valve actuating member 54 afforded by the pin 55 and slot 57 permits member 54 to be moved upwardly a greater distance than is necessary to bring the valve 42 in contact with its seat 43 and thus permits greater freedom in manufacturing tolerances for the several valve operating parts. After the valve 42 has been closed the under side of the valve is exposed to fluid pressure which reinforces the seal initially created through the strength of spring 50.

The initial forward movement of master cylinder piston 12 also moves the toe 37 of valve control rod 28 off of stem 38. If this should occur prior to closing of the valve 42, ball valve 34 will be closed by spring 36 and will be immediately reopened by the fluid discharged from the master cylinder. If valve 42 is closed before toe 37 moves off of stem 38, valve 34 will be held open by the fluid discharged from the master cylinder and will not close even momentarily. The fluid discharged past valve 34 creates a pressure in the conduit system 14 and wheel cylinders 15 and causes the wheel cylinder pistons 16 to apply the brake shoes 17 against the brake drums 18.

When the operator releases the pressure which he is exerting on the pedal 13, this pedal and piston rod 20 are returned to normal position by spring 21. Piston 12 is returned by its spring 24 and as soon as pressure is relieved on this piston and it starts its return movement, ball valve 34 closes, thereby trapping the fluid in the conduit system and wheel cylinders. The return movement of the piston 12 creates a vacuum in the cylinder 11, and the pressure exerted on the upper side of the valve 43 by the fluid under atmospheric pressure in the reservoir 10 overcomes spring 50 and moves valve 42 downwardly and away from its seat 43, thus permitting fluid to flow from the reservoir into the cylinder 11 during this return stroke of the piston 12.

The slot 57 in the member 52 is made sufficiently long to permit this downward movement of the valve 42. As the piston 12 continues its return movement, excess fluid is drawn from the reservoir 10 through port 41, valve chamber 40, passageway 39 and openings 58 provided by spider 56, into bore 30 and thence into cylinder 11. As piston 12 completes its return movement, toe 37 depresses fluted rod 38 and valve 34 and reestablishes communication between the conduit system and bore 30. Return springs 19 on brake shoes 17 thereupon cause wheel cylinder pistons 16 to return to retracted position and force fluid from the conduit system into bore 30.

Since fluid was drawn from the reservoir into the master cylinder during the return stroke of the master cylinder piston, part or all of the fluid returned from the conduit system must flow into the reservoir 10, which it is free to do, past the open valve 42. Cap 49 prevents accidental closure of valve 42 by this return flow to the reservoir.

While I have illustrated and described only one embodiment of my invention, it is understood that my invention is capable of assuming numerous forms, and that the scope of my invention is limited solely by the following claims.

I claim:

1. In mechanism of the class described, the combination of a fluid reservoir, a master cylinder, there being a passageway connecting said master cylinder with said reservoir, a conduit system supplied with fluid under pressure from said master cylinder, valve means interposed between said cylinder and said reservoir, valve means interposed between said cylinder and said conduit system, a piston in said cylinder having a single part contacting with and controlling both of said valve means, and means for reciprocating said piston.

2. In mechanism of the class described, the combination of a fluid reservoir, a compression cylinder, there being a passageway connecting said cylinder with said reservoir, operating means receiving fluid discharged from said cylinder, valve means interposed between said cylinder and said reservoir, valve means interposed between said cylinder and said operating means, a piston reciprocable in said cylinder, means carried by the forward face of said piston for closing said first-mentioned valve means and opening said last-mentioned valve means, and means for reciprocating said piston.

3. In mechanism of the class described, the combination of a fluid reservoir, a master cylinder communicating with said reservoir, a valve controlling such communication, a conduit receiving fluid discharged from said cylinder, a valve controlling communication between said conduit and said cylinder, a single element located between said two valve means for controlling the same, and means for operating said element.

4. In mechanism of the class described, the combination of a fluid reservoir, a cylinder communicating therewith, a valve controlling such communication, a conduit communicating with said cylinder, a second valve controlling said last-mentioned communication, a piston reciprocable in said cylinder, a valve controlling element attached to said piston, said element having a part normally holding said second valve in open position and a second part for actuating said first-mentioned valve, and means for reciprocating said piston.

5. In mechanism of the class described, the combination of a casting providing a fluid reservoir, a compression cylinder, a passageway connecting said cylinder with said reservoir, and a second passageway forming an outlet for said cylinder, a conduit attached to said outlet, a piston reciprocable in said cylinder, valves in said passageways, a member carried by said piston for trolling said valves, said member movable to a point beyond said casting, a removable cap attached to said casting and adapted to receive said member, and means for reciprocating said piston.

6. In mechanism of the class described, the combination of a reservoir, a cylinder, means providing communication between said reservoir and said cylinder, a single valve located in said communication means, a piston reciprocable in said cylinder, means for reciprocating said piston, a conduit connected to said cylinder, motor mechanism connected to said conduit, a single valve interposed between said cylinder and said conduit, and a member reciprocable with said piston to control the simultaneous opening and closing of said valves.

7. In mechanism of the class described, the combination of a compression cylinder, a piston reciprocable therein, a fluid reservoir, means including a valve chamber located at the forward end of said cylinder for establishing communication between said reservoir and said cylinder, a valve in said chamber, motor mechanism operated by said compression cylinder, a conduit communicating with said motor cylinder, means including a valve, a valve chamber establishing communication between said conduit and the forward end of said compression cylinder, a forwardly extending projection carried by said piston and lying between said valves, and means carried by said projection for simultaneously opening one valve and closing the other.

8. In mechanism of the class described, a compression cylinder, a piston reciprocable therein, a reservoir communicating with said cylinder, a valve controlling such communication, a motor cylinder operated by and communicating with said compression cylinder, a valve controlling said last mentioned communication, and a member reciprocable with said piston, and lying between said valves to control the same, said member having a projection normally holding one of said valves open, and a recess normally permitting closure of the other valve.

9. In mechanism of the class described, the combination of a reservoir, a cylinder, means providing communication between said reservoir and said cylinder, a piston reciprocable in said cylinder, means for reciprocating said piston, a conduit connecting said cylinder with means operable in response to fluid pressure impulses created therein, a valve controlling communication between said conduit and said cylinder, said valve located forwardly of said piston, a spring for closing said valve, and means projecting forwardly from said piston and normally maintaining said valve in open position.

WALLACE F. OLIVER.